US007180421B2

(12) United States Patent
Pahlaven et al.

(10) Patent No.: US 7,180,421 B2
(45) Date of Patent: Feb. 20, 2007

(54) RADIO FREQUENCY TAG AND READER WITH ASYMMETRIC COMMUNICATION BANDWIDTH

(76) Inventors: Kourosh Pahlaven, 2456 Indian Dr., Palo Alto, CA (US) 94303; Farokh Hassanzadeh Eskafi, 551 18th St., Brooklyn, NY (US) 11215

( * ) Notice: Subject to any disclaimer, the term of this patent is extended or adjusted under 35 U.S.C. 154(b) by 0 days.

(21) Appl. No.: 11/270,922

(22) Filed: Nov. 12, 2005

(65) Prior Publication Data

US 2006/0103535 A1    May 18, 2006

Related U.S. Application Data

(63) Continuation-in-part of application No. 10/988,271, filed on Nov. 15, 2004.

(51) Int. Cl.
*G08B 13/14* (2006.01)

(52) U.S. Cl. ........................ 340/572.1; 455/73

(58) Field of Classification Search ............ 340/572.1, 340/572.2, 572.4, 572.7, 10.1, 10.2; 455/73, 455/75, 77
See application file for complete search history.

(56) References Cited

U.S. PATENT DOCUMENTS

| 3,299,424 | A | 1/1967 | Vinding | 340/10.3 |
|---|---|---|---|---|
| 3,516,575 | A | 6/1970 | Moffitt | 222/52 |
| 3,541,995 | A | 11/1970 | Fathuaer | 119/51.02 |
| 3,689,885 | A | 9/1972 | Kaplan et al. | 340/10.3 |
| 3,713,148 | A | 1/1973 | Cardullo et al. | 342/42 |
| 4,331,971 | A * | 5/1982 | Bretl | 348/628 |
| 5,677,927 | A | 10/1997 | Fullerton et al. | 375/130 |
| 5,745,856 | A * | 4/1998 | Dent | 455/552.1 |
| 6,550,674 | B1 | 4/2003 | Neumark | 235/383 |
| 6,834,073 | B1 * | 12/2004 | Miller et al. | 375/130 |
| 7,006,553 | B1 * | 2/2006 | McCorkle | 375/130 |
| 7,050,419 | B2 * | 5/2006 | Azenkot et al. | 370/347 |

* cited by examiner

*Primary Examiner*—John Tweel, Jr.
(74) *Attorney, Agent, or Firm*—Ernest D. Buff & Associates, LLC; Ernest D. Buff; Theodore J. Pierson

(57) ABSTRACT

An asymmetric bandwidth communication system enables wireless communication between interrogators/readers and transponders/tags. A transponder transmits TDCIR (Time Domain Carrierless Impulse Radio) signals in the uplink direction and receives non-TDCIR signals, such as electromagnetic continuous waves, in the downlink direction. The transponder may receive partial or whole power from non-TDCIR signals. The TDCIR utilizes electromagnetic impulses with short duration and ultra wide bandwidth. It offers high data rate reliable communication at low power and design complexity. It also demonstrates resilience against path fading, selective absorption and reflection by physical matters and excellent location determination capabilities.

29 Claims, 18 Drawing Sheets

RADIO FREQUENCY TAG AND READER WITH ASYMMETRIC COMMUNICATION BANDWIDTH

This application is a continuation-in-part of U.S. application Ser. No. 10/988,271, filed Nov. 15, 2004.

BACKGROUND OF THE INVENTION

1. Field of the Invention

This invention relates generally to communication between physical objects, item and inventory identification, tracking and management; and more particularly to a system for providing information concerning the identity or status of inventory using a plurality of labels enabled for communication with a computerized inventory management system so that label location and status are tracked continuously from a remote location.

2. Description of the Prior Art

Radio Frequency Identification (RFID) systems that utilize RF signals as means of communication between transponders, normally tags or similar modules, and interrogators, normally called readers, have been proposed by numerous prior art workers; see e.g. U.S. Pat. Nos. 3,299,424 and 3,689,885.

RFID tags in their simplest form comprise an ID, normally in a digital binary form, that is modulating an energy carrier signal such as an electromagnetic or acoustic wave, and is propagated by the tag as described in U.S. Pat. No. 3,713,148. The modulated carrier signal may be other energy carriers, e.g. acoustic waves or light beams.

Radio communication between a transponder tag and an interrogator can be carried out in two substantially different approaches. The first approach involves use of a circuitry in the tag. When exposed to the electromagnetic or acoustic field generated by the reader, the tag antenna comes into oscillation or similarly can couple with the reader field. The tag can use this coupling effect, which manifests itself as an alteration of the original field generated by the reader to present its ID or data. This coupling can be used to link the reader and the tag together. When radio frequency (RF) is used, this coupling can be magnetic coupling (near-field electromagnetic coupling) or backscattering (far-field electromagnetic coupling). The electro magnetic field generated by a reader's antenna induces a current in the tag whose receiver is tuned to the frequency of the field. When the wavelength of the frequency range used greatly exceeds the distance between the reader's antenna and the tag, the electromagnetic field may be treated as an alternating magnetic field and be considered as a transformer with one coil (antenna) located on the reader and the other coil (antenna) located on the tag. Magnetic coupling is commonly deployed in LF (Low Frequency) and HF (High Frequency) bands. The most popular frequencies for magnetic coupling are 135 kHz and 13.56 MHz. When the far-field electromagnetic coupling is deployed, the tag modulates its data back on to the electromagnetic field of the reader by changing the impedance of its own receiving antenna. This change of the impedance causes the tag antenna to effectively act as a reflector. Changes in the antenna impedance effectively reflect some of the electromagnetic energy back to the reader; the reader can then perceive the pattern of the modulation in the reflection. This phenomenon is called backscattering. Under these circumstances the reader can sense the presence of the tag, transmit data and receive the response back from the tag by demodulating the data that the tag has modulated into the field pattern caused by magnetic coupling or backscattering; see e.g. U.S. Pat. Nos. 3,516,575 and 3,541,995.

The second approach is to have a set-up like the one in conventional RF communication. The readers transmit signals that are received by the tags and the tags transmit signals, by means of a transmitter stage, that can be detected and decoded by the readers. With this approach, the structure of the signal transmitted by the tag is inherently independent of the signal received by it. The tag can receive information from the reader in one band and transmit it in a completely unrelated band and with a different signal structure and technology.

There are variations of the first approach that use backscattering in a band whose center frequency is an integer multiple or fraction of the center frequency of the received signal, but this flexibility is limited to similar simple techniques. There are also other approaches using Surface Acoustic Wave, Acoustomagnetic and electrical coupling as means of responding to the reader. However, these approaches can all be classified in the same category of devices that generate a reaction to the original field created by the reader and manipulate the same through this reaction.

In addition to the mechanism needed to modulate and propagate the response of the tag to the reader, other functional units in the tag, require power. One such unit is the logic engine that processes and transports the stored ID or data. Power can be provided by a source of energy that is integrated with the tag, e.g. a capacitor, a battery or an accumulator of some kind. It can also be generated by other means, e.g. by capturing the electromagnetic energy propagated by the reader or similar sources of energy carrying signals. The former category of tags is called active and the latter is called passive; the hybrids constitute the category of semi-active tags. In the case of RF signals, the process of power recovery from the incident signal requires a circuitry that can convert electromagnetic energy to such current and voltage levels that can satisfy the power needs of the tag.

In the first approach, the tag can be a completely passive element in that it can be powered up by rectifying the incident signal and since it is merely reflecting back the incident continuous wave (CW), it does not need to take on the power-consuming task of generating a CW as a signal carrier for transmission. The passive tag responds by presenting its ID or other data through manipulating the incident signal that is in turn sensed by the reader monitoring the frequency band in which the particular modulation is expected.

In the second approach, transmitting the data back to the reader requires power like any other RF transmission, because a carrier needs to be generated and depending in part on the frequency of the carrier, the complexity of the modulation scheme and the required power output. The amount of required power can easily fall outside what can be recovered from the incident signal. Therefore, the second approach is often only applicable to the category of active or semi-active transponders.

Magnetic coupling works only at very short distances. Backscattering relies on small signal reflections that only offer a limited range and a low bandwidth for data exchange between the tag and the reader. Tags made with this approach are inexpensive to manufacture. Their transmission stages are active and their active control and data processing stages are uncomplicated and utilize low power. At short range, they can supply their needed power by capturing electromagnetic energy through simple and affordable power rectification circuitry located on the tag.

Regardless of whether the tag acts as an active transmitter or backscatters passively, communication between a tag and a reader is performed in specific regulated frequency bands. The amount of output power in each band is regulated to protect other devices and bands against interference and saturation. These bands are normally narrow bands in LF (Low Frequency 0.03 MHz to 0.3 MHz), HF (High Frequency 3 MHz to 30 MHz), UHF (Ultra High Frequency (300 MHz to 3000 MHz) and Microwave portions of the RF spectrum.

Generally, there are a number of problems associated with currently available narrowband RFID technologies. Low data rate and lack of noise immunity, limit an item-level tagging and high simultaneous number of interrogations by the reader. The tags are nearly useless in presence of metallic objects, conductive materials, liquids and in general such material that can cause absorption of the RF energy or detuning of the signal. Additional RF problems such as path-fading and multipath interference are frequently encountered by continuous wave (CW) technologies Attempts to remedy the above problems have thus far resulted in additional complexity that increases system costs and power requirements. These issues are mostly addressed by deploying a radio technology that spreads its signal over an extremely wide frequency band. Such technology is conventionally known as Ultra Wide Band (UWB) radio and is described in U.S. Pat. No. 5,677,927. According to the Federal Communications Commission (FCC) definition, a UWB signal has a fractional bandwidth greater than or equal to 20% or a total bandwidth of 500 MHz or more regardless of the fractional bandwidth. The fractional bandwidth percentage is defined as:

$$B_f = 2\frac{f_h - f_l}{f_h + f_l} \cdot 100\% \geq 20\%$$

where $B_f$ is the fractional bandwidth, $f_h$ and $f_l$ are the highest and lowest −10 dB frequencies of the signal spectrum. The fact that these extremely wide bands will traverse over narrow bands of frequency dedicated to different operations, puts severe constraints on the power output of a UWB transmitter that currently is at or below that of unintentional electromagnetic radiations from electric devices. The definitions set by FCC aim at drawing guidelines applicable to regulating the use of the technology rather than defining the qualitative differences that distinguish UWB from the conventional radio technology. Furthermore, the FCC may change the quantitative criteria that constitute the definition of UWB radio; it may even make substantial changes to the definition. Despite the plasticity in the definition, the only reliable reference is the one set by the FCC, even if it is subject to future changes. The FCC definitions and regulations can be found in the First Report and Order: Revision of Part 15 of the Commission's Rules Regarding Ultra-Wideband Transmission. Federal Communications Commission, Feb. 14, 2002. ET Docket 98–153.

Before its current nomination, UWB Radio was intermittently called Impulse Radio, Carrierless Radio or Baseband Radio. In practice of UWB radio technology, very short duration impulses were deployed in a time domain that would create an extremely wide bandwidth in the frequency domain. That is, UWB was principally an Impulse radio that was per definition carrierless as opposed to conventional RF technology that uses a carrier frequency as means of propagating information. This specific technology is called Ultra Wide Band Impulse Radio (UWB-IR). The pulse shape was evolved to have optimal behavior in terms of antenna and receiver design as well as spectral efficiency. As a consequence of regulation by the FCC, approaches other than pure Impulse Radio have been proposed to be deployed within the regulated spectrum under the notion of UWB. The appeal of the newly introduced large spectrum segment caused new thinking in the domain of traditional radio design. Shannon's theorem, describing the relationship between the bandwidth and data rate, would yield equal benefits to a conventional radio technology that could be fitted to the ultra wide bandwidth. The theorem formulated as $$C = B\log_2\left(1 + \frac{S}{N}\right)$$

describes how capacity (C) tends to remain high in spite of a very low signal to noise ratio (S/N) as long as bandwidth (B) remains high. Traditional radio technologies adapted to the wider bandwidth will not however yield other qualitatively crucial features of Impulse radio, such as low power and low complexity, resilience to multipath fading and unmatched location determination potential. A conventional radio technology will remain a Frequency Domain technology even at an ultra wide bandwidth as opposed to an Impulse Radio that is a Time Domain technology.

Narrowband RFID techniques are invented and utilized across a broad range of applications. UWB-IR radio communication has also been applied to RFID in several embodiments for different applications; see e.g. U.S. Pat. No. 6,550,674. The embodiments involve larger tags that deploy internal batteries and complex transceivers.

As a consequence there remains a need in the art for a communication system with tags that (i) packs a large amount of data such as inventory status, part location and the like; and (ii) is capable of simultaneously communicating with a massive number of transponders to enable item-level tagging; and (iii) consumes very low power, enabling remote operation, while at the same time being resistant to noise levels present in common industrial working environments.

SUMMARY OF THE INVENTION

The present invention overcomes the shortcomings of the current RFID systems by merging Impulse Radio with conventional continuous wave energy carriers. Narrowband continuous wave and ultra wideband Impulse Radio technologies are synergistically combined. Beneficial effects of continuous wave and Impulse Radio communication between transponders (tags) and interrogators (readers) are enhanced providing high speed simultaneous communication of large packets of data from many non-powered transponders which receives required power from the interrogator's continuous wave. A CW link from the reader to the tag (downlink direction) enables transmission of high amounts of RF power in a well-defined narrow band. In the frame of allowed power envelopes set by regulatory authorities this narrow band of RF power energizes passive tags in a manner that allows their internal circuitry to be powered up wholly or partially by the received signals. Using an Ultra Wide Band Impulse Radio link from the tag to the reader (uplink direction) promotes a high data rate, low power, low cost, noise tolerant transmission and provides uncomplicated design. Massive simultaneous communications between tags and readers are economically and reliably achieved. Advantageously, the communications are resilient to multi-path fading, penetration and reflection problems prevalent with conventional RFID systems.

The present invention also overcomes problems encountered by conventional UWB-based transponder systems. A UWB radio transmits low power signals over a very wide band. Power per MHz of spectrum in a UWB-based system is typically much lower that required for a CW radio, but the total output power integrated over the whole claimed spectrum need not be less—although it often is—than the power propagated by a conventional radio in its narrow band. Transmitting high power over the extremely broad band occupied by a UWB signal tends to pollute the RF spectrum and to interfere with wireless devices in many bands. For this reason, UWB signals are often transmitted at noise-level. Due to these constraints, UWB signals are typically not strong enough to energize tag circuitry from a useful distance. Moreover, even though the UWB Impulse Radio transmitter is simple to design, the receiver stage tends to be relatively complex and power consuming. Conversely, a narrowband receiver utilizes low power and is relatively noncomplex, especially when modulation schemes such as Amplitude Shift Keying (ASK) are involved. By using Time Domain Carrierless Impulse Radio (TDCIR) as means of transmitting data in the uplink direction (from the tag to the reader) and continuous wave signals in the downlink direction (from the reader to the tag), the beneficial effects of ultra wide band and of narrow band can be achieved simultaneously. The present invention provides a target and detector based on UWB-IR technology or more explicitly Time Domain Carrierless Impulse Radio (TDCIR) with a fractional bandwidth that is equal to or larger than 10% or a bandwidth of larger than 50 MHz, regardless of the fractional bandwidth.

Advantageously, there is provided in accordance with this invention, a tag that deploys separate transmitter and receiver stages. With this arrangement, the transmitter function can be completely decoupled from the limitations that the receiver design can impose on it. The ability to combine TDCIR for transmission and Non-TDCIR receiver stage, specifically narrowband continuous wave, constitutes an asymmetric mode of communication that is a representative example of the beneficial effects derived from such decoupling.

In accordance with the present invention, there are provided transponders and interrogators that operate in conformance with the asymmetric mode while, at the same time, maintaining backward compatibility with legacy RFID systems. Since the downlink communication, i.e. the communication from the interrogator to the tag, is carried out over a Non-TDCIR link, this link can retain the characteristics and specifications of legacy RFID systems. For example a Gen-2 tag (second generation RFID standard) communicates within the 915 MHz ISM band. The same continuous wave, command formats, modulation, coding scheme, collision detection and other techniques used in that standard can be used to communicate with the tag of the present invention.

Significantly, a tag interrogated by the system of this invention can communicate over its TDCIR link in the uplink direction, i.e. the direction from the tag to the reader. Since the TDCIR transmitter can have its own uplink antenna—which is the optimal approach from a signal propagation point of view—it does not functionally interfere with the Non-TDCIR elements of the unit. The TDCIR transmitter works in parallel with a backscattering, magnetic coupling scheme or any other approach used with conventional transponders. For example, the invented tag can have an additional circuitry for changing the impedance of its downlink antenna so as to create a backscattering effect similar to that of a conventional RFID tag. In this manner, the tag can be used in a legacy network and use e.g. backscattering in that network. On the other hand, such a tag can also work in a network that operates in accordance with the present invention, and thereby take full advantage of the network's features. That is to say, a tag interrogated by a legacy reader will respond by backscattering, magnetic coupling, and the like. When interrogated by a reader enabled by our invention, the tag will respond by means of TDCIR signals. Even in the case of a common antenna, this fully backward compatibility can be maintained. In such a system, the controller switches the antenna between TDCIR and Non-TDCIR signal paths in accordance with the direction of the data flow.

In accordance with the present invention, there is provided a method and means for transmitting increased power to a transponder. Multiple tuned circuits are deployed in the front-end of the transponder receiver so as to capture energy from different Non-TDCIR bands simultaneously.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

A fundamental element of the present invention is the UWB-IR technology. In this document, we do not restrict ourselves to the definitions of UWB as established by the FCC. The uncertainty of the limits of the current regulation and the resulting plasticity of the FCC definitions suggests the necessity of defining this technology as utilized and applied to this invention. Accordingly, as used hereafter, such UWB-IR technology is referenced as Time Domain Carrierless Impulse Radio (TDCIR); and defined as a time domain carrierless impulse radio with a fractional bandwidth equal to or greater than 10%, or a bandwidth greater than 50 MHz, regardless of the fractional bandwidth.

$$B_f = 2\frac{f_h - f_l}{f_h + f_l} \cdot 100\% \geq 10\%$$

where $B_f$ is the fractional bandwidth, $f_h$ and $f_l$ are the highest and lowest $-3$ dB frequencies of the signal spectrum.

The embodiments that are described here are all based on currently mandated limits set by the FCC and fully compliant with both the definition of UWB as set by the FCC and TDCIR, as herein set forth. The criteria for all the claims herein are based on the definition of TDCIR, unless explicitly expressed otherwise. Impulse Radio (IR) offers an extremely simple transmitter and receiver design. It entails unmatched features that are not offered by any single conventional frequency domain radio technology. The signal is an impulse and this impulse is not modulated on a carrier, but is freely radiated into the air. Modulation is accomplished by altering the individual or shared characteristics of the impulses directly. Impulse Radio is qualitatively different from conventional narrowband and wideband CW radio technology. It is a carrierless radio that generates an extremely wide bandwidth. Even continuous wave radio technologies such as CDMA that use spread spectrum techniques are fundamentally different from Impulse Radio and behave fundamentally differently. Significantly, IR is carrierless and the signal is spread over a far larger spectrum than the spectrum spanned by CDMA. Wideband CDMA and CDMA2000, two very well-known wideband technologies in the 2 GHz frequency range, have several bands clustered together, and span only over approximately 5 MHz of spectrum. The Definition of TDCIR in the 2 GHz range requires a band of at least 50 MHz wide.

The duration (pulse width) and shape of an impulse determine the signal bandwidth and its center frequency. Gaussian monocycle is a commonly used impulse for IR transmissions. A Gaussian monocycle is the first derivative of a Gaussian and is defined as:

$$G'(t) = A\frac{t}{\tau}e^{-\left(\frac{t}{\tau}\right)^2}$$

where A is an amplitude factor, t is the time variable and $\tau$ is a parameter that determines the pulse width.

Figure 16:
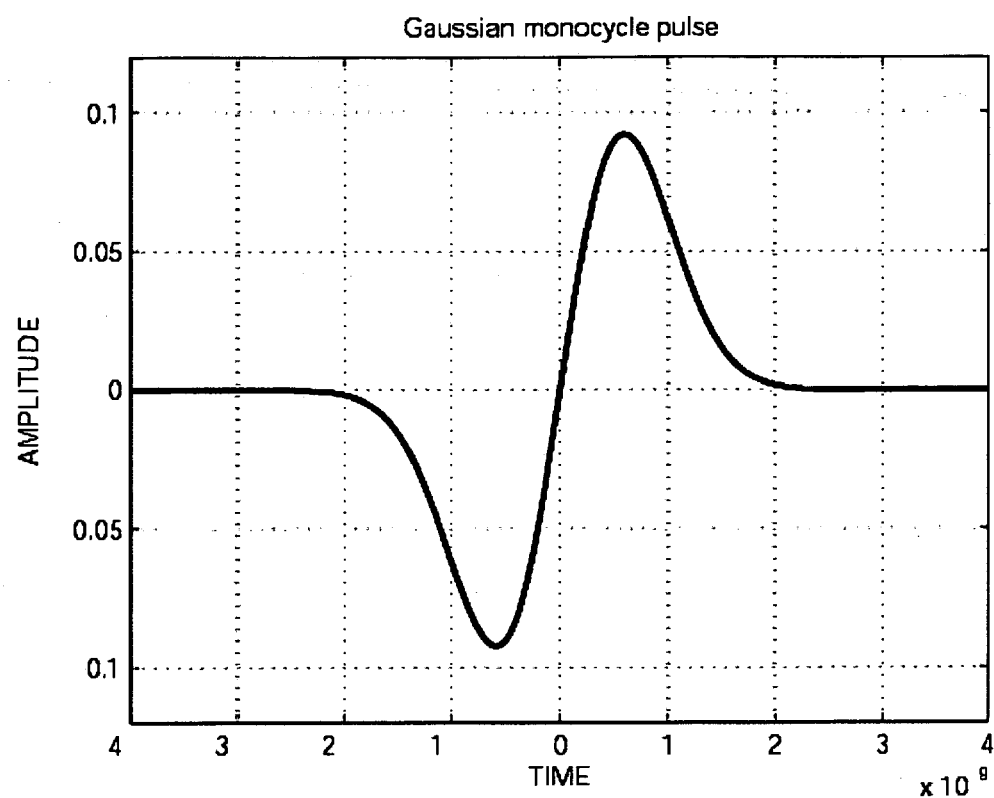
FIG. 16 depicts a Gaussian monocycle as used in the TDCIR transmitter of the first embodiment.

This signal is depicted in FIG. 16. The Figure illustrates the signal in the time domain and its Power Spectrum in the frequency domain. The shorter the impulse is, the wider its spectral spread will be. The center frequency $f_c$ of the monocycle is nearly the inverse of the pulse width $T_w$:

$$T_w \approx 1/f_c$$

which is clearly visible in the Figure; the 4 nanosecond wide pulse has its center frequency in around 250 MHz and occupies nearly 1 GHz of spectrum.

Figure 17:
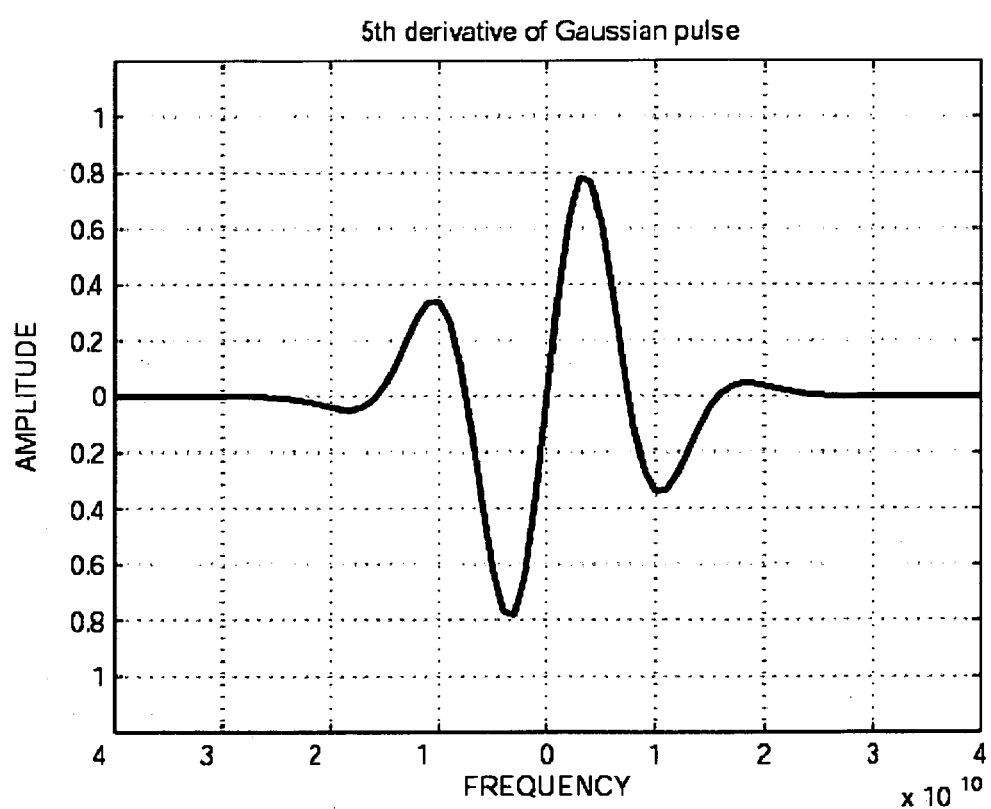
FIG. 17 depicts a 5th derivative of a Gaussian as used in the second embodiment.
Figure 18:
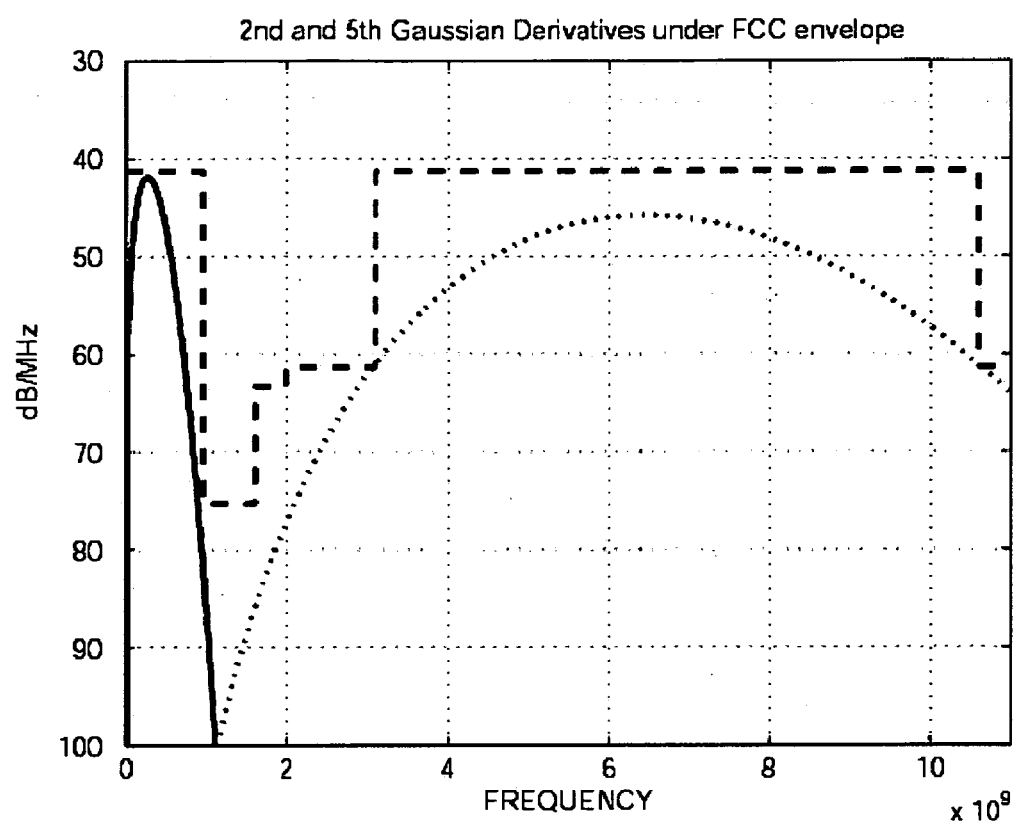
FIG. 18 depicts the Power Spectral Density of the monocycle (solid line), the 5th derivative of Gaussian (dotted line) and the FCC envelope (dashed line).

The $5^{th}$ derivative of the Gaussian has attracted considerable attention, because of its ability to fall under the large frequency swath in between 3.1 and 10 GHz. It is expressed as:

$$G^5(t) = B\left(\frac{60t}{\tau^5} - \frac{80t^3}{\tau^7} + \frac{16t^5}{\tau^9}\right)e^{-\left(\frac{t}{\tau}\right)^2}$$

where B is an amplitude factor. This signal is depicted in FIG. 17. FIG. 18 shows the Power Spectral Density of the monocycle and $5^{th}$ derivative as a thick dotted line along with the by the FCC mandated limit as thin dotted line.

Recent attention to Impulse Radio and its application to RFID have brought about new possibilities in terms of higher data rate, lower power consumption, location determination, resilience to multi-path fading and environmental impacts such as detuning and material penetration. The UWB Impulse corresponds to an extremely wide bandwidth in the frequency domain.

Due to its impulse nature, the transmitter stage in the UWB-IR radio is very simple. The requirements of the UWB receiver stage on filters, amplifiers and detection circuits that can handle the extremely wide bandwidth and short noise level pulses, among other factors, make its design more challenging. In comparison, with respect to power implementation difficulty and complexity a conventional radio can be more challenging in the transmitter stage and less challenging in areas that involve constraints imposed on the amplification and detection stages of the receiver.

UWB-IR radio is extremely low power while it offers a very high data rate. Due to its very wide frequency content, impulses can penetrate material and still maintain relatively good resolution. They are resilient to multi-path limitations imposed on conventional radio. These qualities have made UWB-IR a natural choice for high performance Radars and ground penetrating mine detectors.

Figure 6:
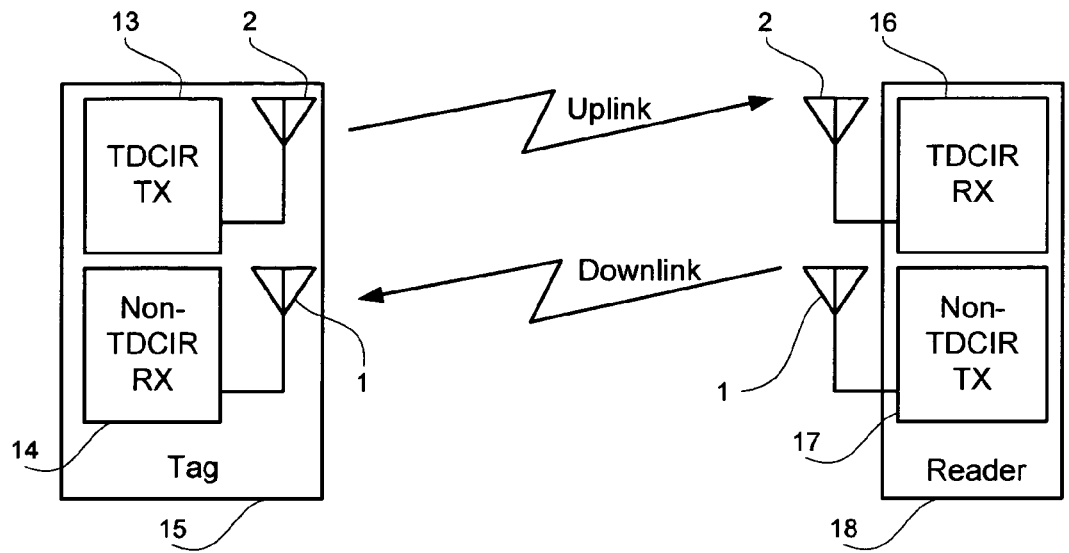
FIG. 6 is a schematic diagram of the basic communication between a transponder tag and interrogator/reader.

The embodiments described herein all share a central core: a TDCIR uplink and a non-TDCIR downlink; as detailed in FIG. 6. At the same time their fundamental point of departure from each other is on whether they utilize other additional up- or downlink technologies. All of the transponder embodiments here use continuous wave RF signals at least partially as the source of energy, but the second embodiment also uses the same continuous wave link for additional uplink communication and the fourth embodiment uses TDCIR signals for additional downlink communication. The additional TDCIR downlink aims at bringing the TDCIR signal properties to full utilization in both directions. The additional non-TDCIR uplink is used to keep the transponder backwardly compatible to legacy systems. The difference between these categories, although subtle, is so fundamental in terms of functionality that they are claimed as separate embodiments.

The first embodiment represents a basic design in that it only utilizes TDCIR uplink and non-TDCIR downlink. The interrogator in this first embodiment uses the 915 MHz UHF ISM band as its non-TDCIR front end to interrogate the tag, called the downlink. The used band could have been in any portion of the spectrum where radio communication is possible; UHF 915 MHz ISM band is publicly available and offers a good compromise between data rate and range, which is why it has been chosen here and the Gen-2 standard. The recipients of these narrowband signals, i.e. the transponders, transmit their responses back to the readers in a stream of TDCIR impulses. This means that each reader uses at least a CW transmitter and a TDCIR receiver, while each tag utilizes at least a TDCIR transmitter and a narrowband receiver. This asymmetric utilization of the bandwidth, which is the core of this invention, provides many benefits including:

1) A TDCIR transmitter is very simple, low power, easy to design and low cost. This is true for a narrowband receiver as well. By deploying these two simplest combinations of the TDCIR and narrowband technologies, the tag, which is the most critical element of an RFID network, will end up having a simple and low cost solution;
2) A TDCIR transmitter offers an RFID tag that is resilient to multipath fading, performs well in penetrating most non-metallic materials and does not suffer as much as CW signals from reflection problems caused by metallic objects, the Achilles heels of all narrowband RFID tags.
3) Furthermore, Impulse Radio provides an RFID system with unique capabilities in terms of location determination that are not offered by CW radio. A major obstacle in determining the distance to an object by means of RF signals is that echoes from the original signal can travel along a multitude of paths that easily become undistinguishable from the shortest or direct path. UWB signals, however, have distinctive windows of arrival in the time domain. Detecting UWB impulses in the expected window of arrival dramatically increases the ability to isolate the real signal from its echoes and thereby augments the location determination abilities of the system
4) The CW receiver of the tag can be tuned to listen to a narrow channel, which in turn can enhance detection ability. The virtue of having a narrow band receiver in the tag also enables the reader to exploit the maximum allowable power output in the allowed band without interfering with other radio systems. Thereby the reader can provide enough signal strength to power up the tag through its narrowband receiver. A reader with a UWB transmitter would not be able to output enough RF energy to power up the tag at useful distances, without polluting its utilized spectrum or enforcing impractically large antenna on the tag.

Since the transmitter stage of the tag is a very low power UWB radio and its receiver stage can provide it with more power through the powerful incident narrowband signals, a tag that can be completely passive and still offer long range, high bandwidth location determination and relative immunity to reflection, multipath fading and absorption can be realized.

The tag in this embodiment uses a Gen2 protocol on the downlink and powers up and communicates with the tag in accordance with those protocols; see (Gen2 Specs 05). The Unique Identifier (UID) code of the chip is stored in its memory and is retrieved by the Finite State Machine (FSM) block that manages and supervises the different functions of the chip. The retrieved UID is encoded and shifted out in a bit stream of baseband pulses to the delay generator. The latter transmits each bit delayed by a certain amount of time that is a function of the position of each pulse in its time slot and in its frame. A pulse shaping module generates Gaussian monocycles of 4 ns duration that are phase shifted 0 and 180 degrees for a logical 1 and 0 respectively. ("Monocycle: A Study of a Versatile Low Power CMOS Pulse Generator for Ultra Wideband Radios", Kevin M. Marsden, Masters Thesis. Virginia Polytechnic Institute and State University, Dec. 200) suggests a simple yet very versatile approach to generate a Gaussian monocycle by essentially four transistors.

The output bridge acting as a power amplifier, the TDCIR antenna and the ESD protection block together also act as a bandpass filter on the monocycle and are designed to filter out the out of band frequencies.

The second embodiment deploys an additional impedance manipulation circuitry that makes the transponder completely accessible under legacy standards such as the UPC Global Gen2 standard (Gen2 Specs 05). The price to pay is an additional block of backscatter modulator, a more complex baseband/MAC unit and a non-TDCIR antenna that cannot anymore be optimized for reception only.

This second embodiment also presents a rechargeable power source that is charged by the incident power and runs the system when the incident signal is missing or too weak to provide the system with enough power. The presence of an external power source is a trivial matter when the data communication is a standalone unit as opposed to a backscattering system that is made to reflect back the incident signal rather than propagate the signal by its own power.

The high data rate offered by the TDCIR transmitter makes it possible to have additional sources of data flow that can use the invented circuitry as a transceiver for communication with the reader or the outside world. Two sensor circuits, one on-chip and another off-chip in this embodiment present the instances that demonstrate this ability. The on-chip signal is a temperature signal that uses the CMOS band-gap voltage of the chip to detect temperature variations of the chip and the item on which the tag is mounted. The external sensor is a MEMS vibration detector that can provide the reader with data about what kind of environment the tag is or has been experiencing in terms of temperature and vibration in real time or during transportation.

This second embodiment also utilizes a "Backscatter Modulator" block that effectively renders this embodiment fully backward compatible with legacy systems. This function is elaborated on later on in this section and in the description of FIG. 8.

This second embodiment uses a 5th derivative of Gaussian as its impulse. This pulse is depicted in FIG. 17. As presented in FIG. 18, this pulse is occupying the bulk of the available spectrum in the 3.1–10 GHz band. Kim et al. suggest an approach to generate a 5th derivative impulse by well known digital elements; see ("5th derivative: All-digital low-power CMOS pulse generator for UWB system", H. Kim, D. Park and Y. Joo, ELECTRONICS LETTERS 25 Nov. 2004 Vol. 40 No. 24).

There are other approaches to impulse generation that more efficiently utilize the FCC envelope. However, since most antennas act as differentiators on signals, a pulse like a Gaussian whose derivatives also maintain its spectral characteristics, offers a less surprising practical outcome.

The third embodiment is principally similar the first embodiment, but it presents the ability to use the same antenna for the TDCIR transmitter and the continuous wave receiver. An ultra wide band radio's fundamental dissimilarity with conventional continuous wave radio manifests itself also in the antenna circuitry and its design. While it is a simpler matter to tune a narrowband antenna to the frequency band of interest to the receiver, an ultra wide antenna will not have a tuning frequency to begin with. A typical narrow or wide band antenna will suppress a considerable portion of the signal spectrum of an ultra wide band radio. However, there are antenna technologies that can act as good compromises for both radios. Fractal antennas constitute one such technology that cannot fully exploit the ultra wide band nature of a TDCIR radio. Their multiple frequency sensitivity can cause an ultra wide band of multiple bands linked together. The dips between the bands can be successfully used as means to filter out major interferers such as broadcast radio and TV, mobile phones and related access points, Wireless LANs, etc. This embodiment utilizes a Sierpinski antenna to achieve this set of features. ('On the Behavior of the Sierpinski Multiband Fractal Antenna' Carles Puente-Baliarda, Jordi Romeu, Rafael Pous, Angel Cardama, IEEE TRANSACTIONS ON ANTENNAS AND PROPAGATION, VOL. 46, NO. 4, APRIL 1998) describes some details involved in design of a Sierpinski antenna.

A variant of this invention deploys a multi-band continuous wave energy collection segment that collects energy from several different frequency bands that can be proactively generated by the reader or an energizing beacon, or that are ambient signals available in the environment. This third embodiment and its use of the Sierpinski antenna constitute a superb embodiment where this energizing scheme can be applied. This multi-band energy absorption scheme is detailed in FIG. 13.

Figure 14:
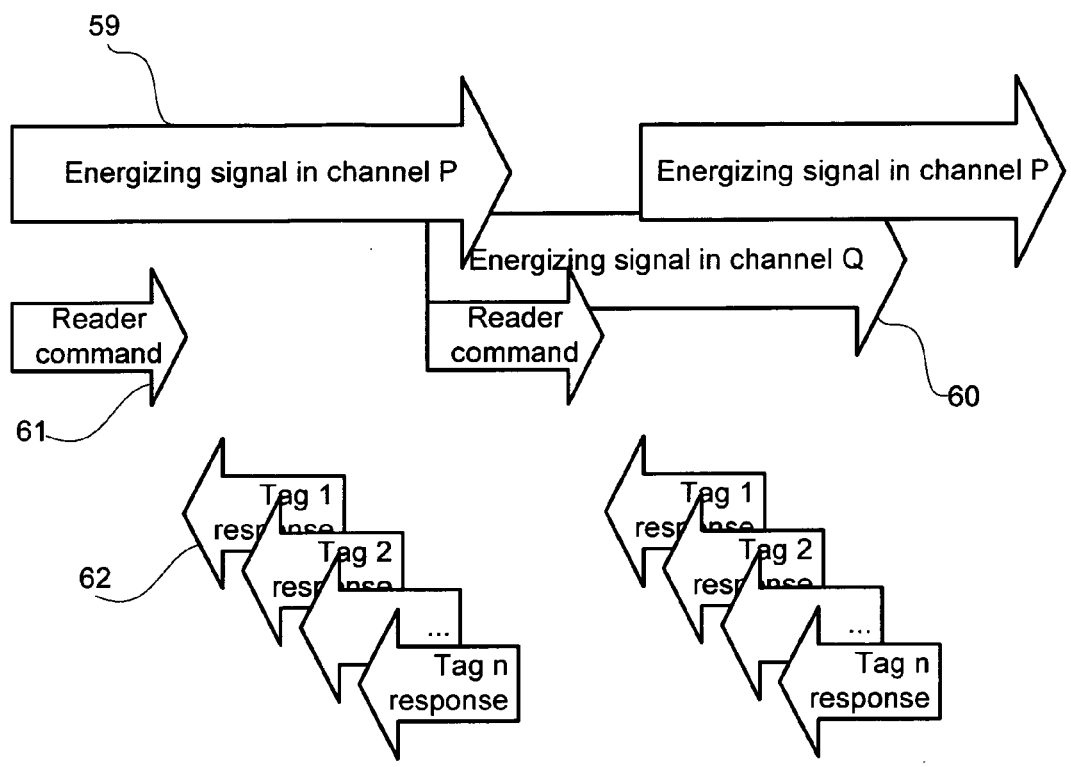
FIG. 14 is a schematic diagram depicting the direction of the signals and the overlapping nature of the energizing signal with respect to the data exchange between the multiple tags and a multiple readers that is capable of multiple simultaneous continuous wave radio transmissions.

A reader signal is normally a carrier on which the reader command and data are modulated. This carrier signal also provides the power for the tag. The signal from the reader to the tag can be continuous or sequentially pulsed, depending on the way the tags need to be powered up, the number of the tags, and the multi-access method used for simultaneous access of multiple tags. A reader can choose to power up tags with a combination of bands and propagation techniques. For example, utilizing different bands can be used as means of accessing different classes of tags. In the same way, the directionality of the antenna can be exploited to access tags located in that particular directions. If the network deploys a TDMA (Time Division Multiple Access) scheme, the tags will respond sequentially in accordance with the timing protocol. However, the duration and the band in which the signal is transmitted by the reader can cause different tags or subnets of tags to be powered up and respond, simultaneously or sequentially. FIG. 14 illustrates another embodiment of the invention in which case the carrier signal is continuously broadcast over all tags in the network in channel P, while the same reader also transmits a narrow band signal in band Q, but only for a specific subnet of tags, which can, e.g. need the extra power because of being far from the reader. In this embodiment, the tag is equipped with additional circuitry that allows the tag to capture electromagnetic power from different bands of the spectrum. For example, the limits of FCC on power output in the 915 MHz ISM (Industrial Scientific and Medical) band can be combined with the power output allowed in the 433 MHz and 2.4 GHz ISM bands. A tag that can recover power and/or data from both of these bands can enhance its ability to gain more RF energy and achieve a better total performance.

The multi-band energizing scheme can be used as a multi-access facilitator, but it can also provide increased bit-rate from the reader to the tags, enhance location determination, and in general increase the system performance.

Figure 8:
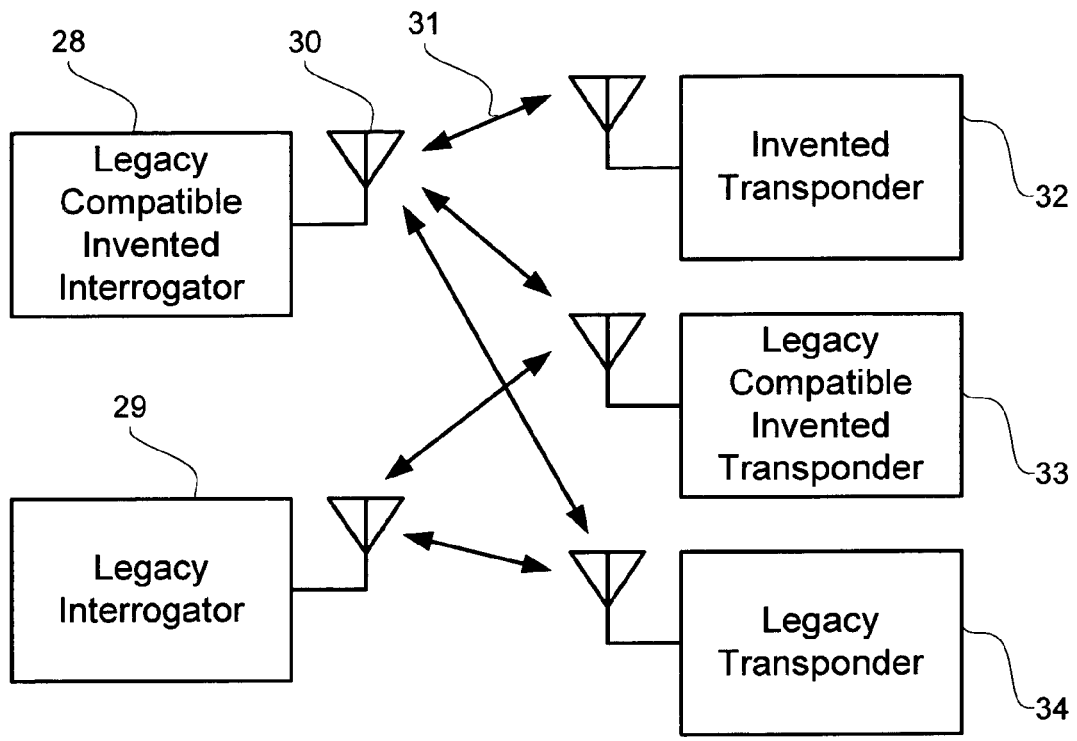
FIG. 8 is a block diagram depicting a legacy transponder compatibility with legacy compatible TDCIR transponder communicating to a legacy interrogator and legacy compatible TDCIR interrogator/reader.
Figure 10:
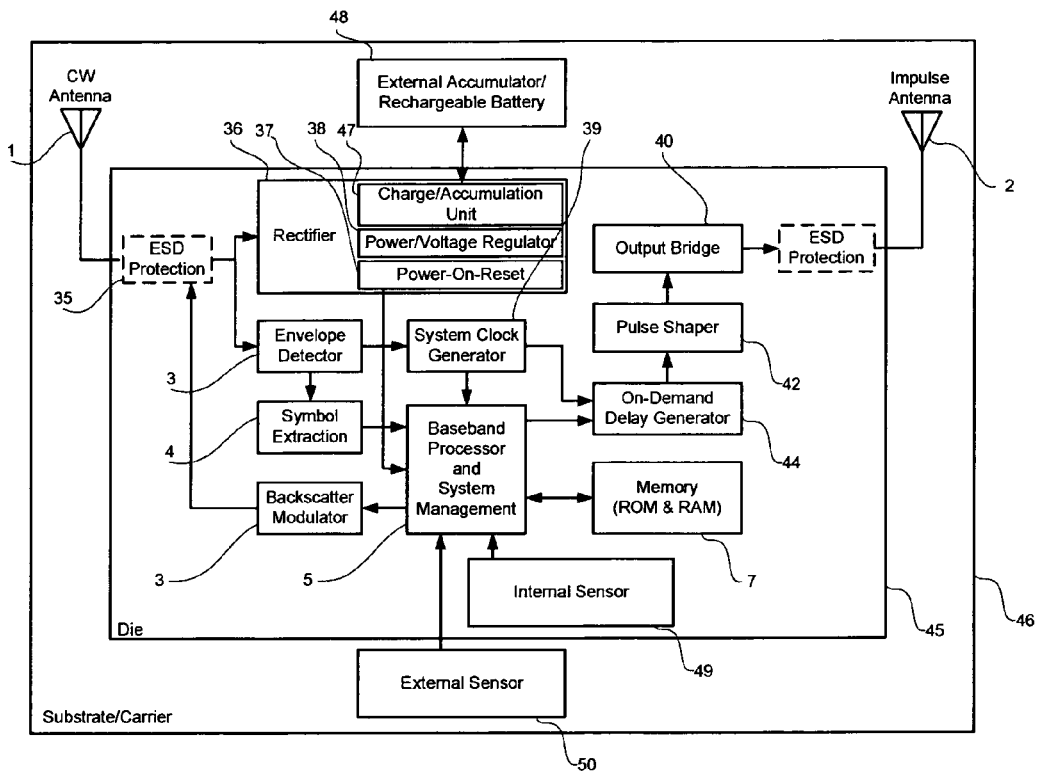
FIG. 10 is a block diagram depicting a partly powered semi-active transponder that is capable of backscattering.

In the second embodiment of the present invention, the narrowband receiver of the tag can behave like a legacy RFID tag, e.g. perform magnetic coupling or backscattering. In this embodiment, the tag will have the additional circuitry to create the return signal in accordance with the technology in use (e.g. magnetic coupling, backscattering, etc.) and modulate its ID and data on this returned signal. FIG. 8 illustrates this embodiment. As depicted in the figure, a reader that is an embodiment of this invention with said backward compatibility can communicate with legacy tags as well as tags communicating using TDCIR. Furthermore, tags of this second embodiment exhibit backward compatibility and communicate with legacy readers and systems. FIG. 10 shows this backward compatibility of the second embodiment using the "backscatter modulator".

Figure 12:
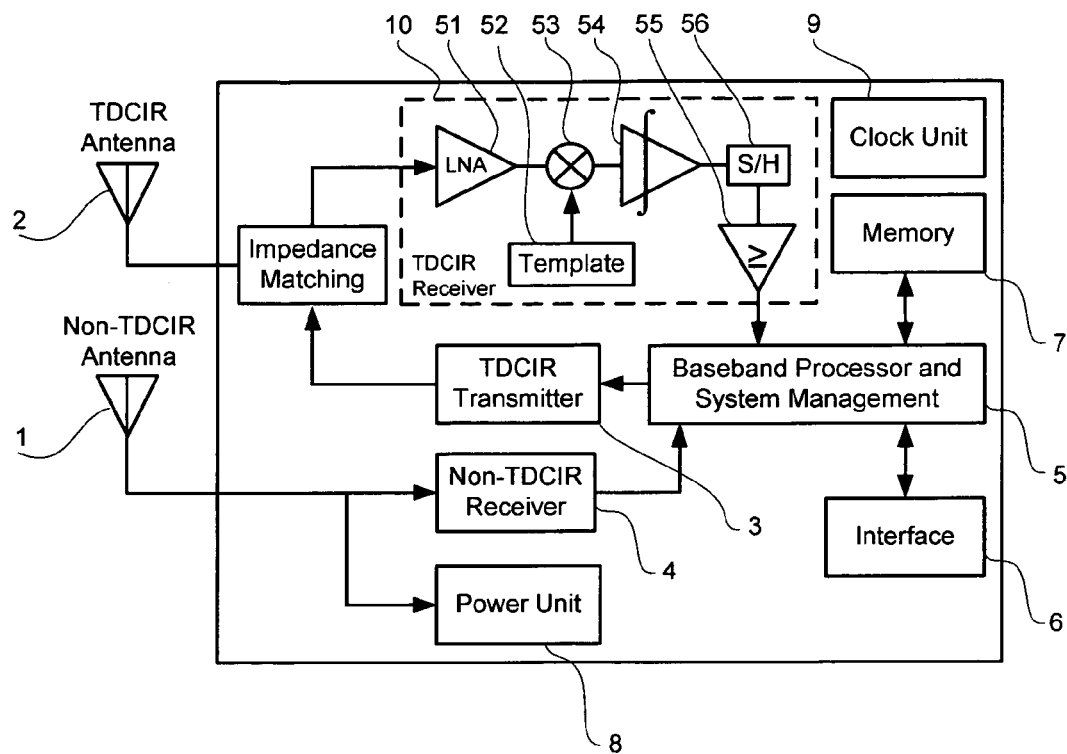
FIG. 12 is a block diagram depicting a transponder according to the third embodiment that is capable of transmitting and receiving TDCIR signal and receiving non-TDCIR signal.

The fourth embodiment is depicted in FIG. 12 and presents a transponder similar to the first embodiment with the major difference that the fourth embodiment implements a TDCIR receiver as well. The downlink is both a CW signal and a TDCIR signal, while the uplink is TDCIR only. The benefit of this design is in its ability to exploit ultra wide band features in both directions. The receiver block constitutes a very simple form of ultra wide receiver composed of an ultra wide band Low Noise Amplifier (LNA) that is mixed with a signal template. The output is forwarded to an integrator that accumulates the mixer output into values that can be detected by a comparator at the output as zeros or ones. This fourth embodiment is also equipped with a general purpose interface that can be used to connect it to other devices or be used as a programming or testing port.

Figure 7:
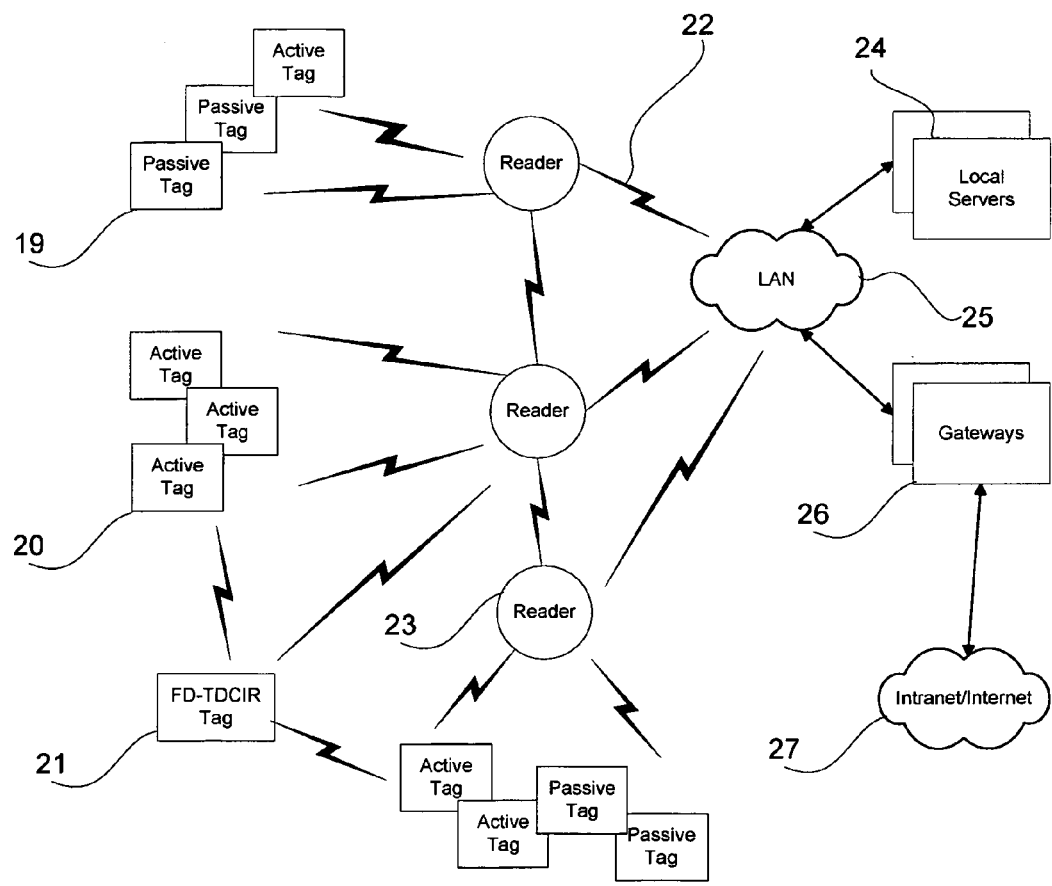
FIG. 7 is a block diagram depicting a multi-band energizing and communication design using passive and active tags in a network of interconnected readers.

A network architecture for different embodiments of this invention is illustrated in FIG. 7. A multitude of readers can be present in this network, each serving a number of tags that may be members of different subnets of different readers simultaneously. These tags could be passive, active or legacy tags that do not comply with the technology described in this invention, but still accessible to the readers, because of the backward compatibility of the readers to the legacy RFID tags.

Readers communicate with the tags wirelessly. However, they can communicate with each other through a wired or wireless communication. This flexibility in connection is also true about the communication between readers and local servers and gateways. The readers and other elements of the network such as local servers, gateways, databases, and storage units can share or create a Local Area Network (LAN) that can internally be interconnected with wires or wirelessly. Finally, the network can connect to external networks and the Internet through its gateways or other computers in the LAN that are capable of external communication.

FIG. 7 also illustrates the high-level architecture of the system that is an embodiment of this invention. At the lowest level of the hierarchy, there are a considerable number of items with active and passive tags mounted on them. The presence of a TDCIR transmitter in the tags warrants for the system's capability to reach a massive item-level deployment; the high data rate and thereby a large system capacity allows for mass interrogations in short time intervals. A TDCIR transmitter is capable of achieving data rates in the order of hundreds of mega bits per second. Even though such data rates require a level of power consumption and baseband complexity that the economy and needs of an RFID tag do not normally match, lower data rates at lower power consumption and lower complexity can be achieved by a suitable trade-off; notably since impulse radio is inherently capable of effecting such trade-offs. For example, a higher bandwidth can be exchanged for robustness, by devoting a larger portion of the total bandwidth to pulse repetitions rather than useful data. In the same manner decreasing pulse repetition can result in lower power consumption or longer intervals between the impulse bursts can result in lower data rate, but also lower power consumption. A backscattering radio has an inflexible design; it is basically a reactive system that can only manipulate an available electromagnetic filed and is incapable of proactive adjustments to the needs and realities at hand. Even a standalone CW transmitter has limited maneuverability compared to a Impulse Radio transmitter, among other things because it can only communicate by modulating its information on a continuous wave carrier signal that is a major source of power consumption and whose well-defined frequency constrains the system from adapting to environmental and conditional adjustments. A CW system with comparable complexity and power demand cannot match the capacity of an ultra wide band system. The high capacity can in turn translate into a larger set of tags, because the amount of data that each tag transmits is limited and often constant.

Figure 1:
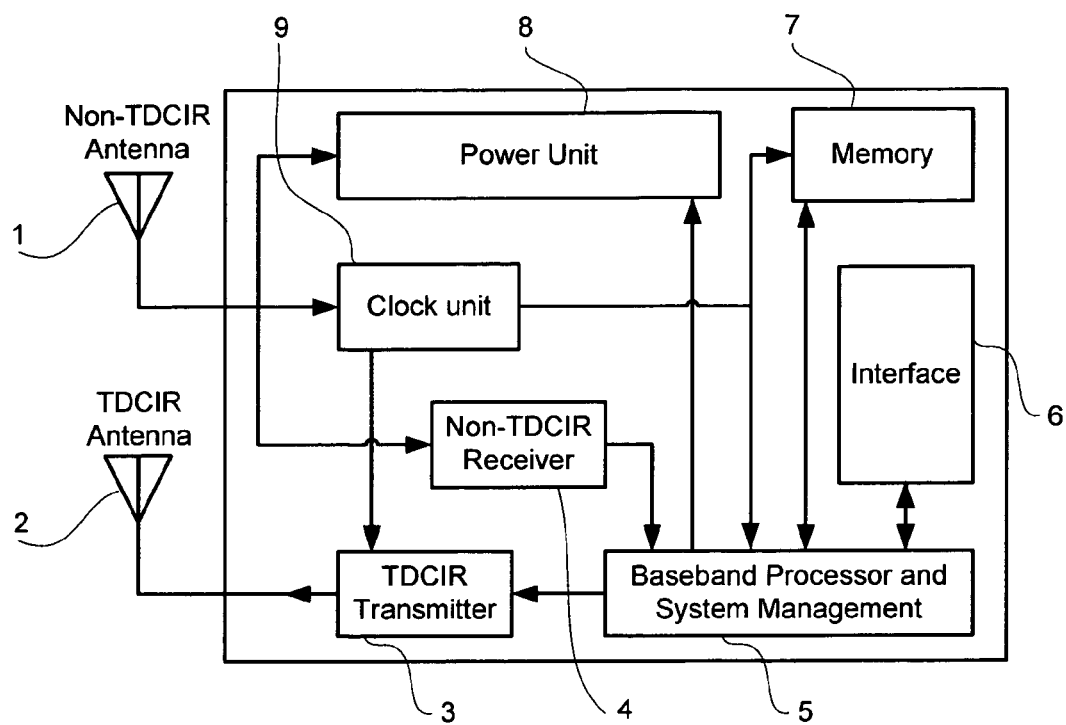
FIG. 1 is a block diagram of the main components of a transponder or tag in the first embodiment of the invention.

Referring to FIG. 1 there is shown a block diagram of the main components of a transponder or tag in the first embodiment of the invention. A non-TDCIR antenna (1) is the first stage of the receiver front-end that is capable of absorbing energy from non-TDCIR signals in general and electromagnetic energy from the continuous waves radiated from interrogating devices in particular. In the case of a passive UHF RFID tags, this antenna is tuned to the UHF band. The continuous wave signal radiated from a reader carries the system clock signal, commands, data and time references that are recovered by different units of the tag. The power recovery unit (8) rectifies the incident continuous wave and regulates it to voltage levels required by different subsystems of the tag. A Power on Reset unit monitors the voltage levels of the power recovery unit to make sure the total unit will function properly. The clock unit (9) and the non-TDCIR (4) blocks take the incident signal detect its envelope and recover the data of interest. These units normally share an envelope detector on which the clock and data are modulated, but in some cases, the clock signals are directly recovered from the incident wave. The clock unit also provides other free-running or synchronous clock signals, required by units that have different requirements on the system clock, such as the baseband/Medium Access Control (MAC) units (part of 5), impulse generator (part of 3) and potential FLASH memory blocks (part of 7). System management, control, communications and computations are handled by the baseband processor and system management (5). This unit also controls all the peripheral interfaces (6) to circuitries inside or outside the chip. Varieties of this unit may require a combination of different memory technologies represented by block (7) in the figure. The task of transmitting the tag data back to the reader lies upon the TDCI transmitter (3) that receives its bit stream from (5), positions and shapes the impulse properly and runs them through the amplification and filtering stages as necessary. This signal is propagated by the TDCIR antenna (2).

Figure 2:
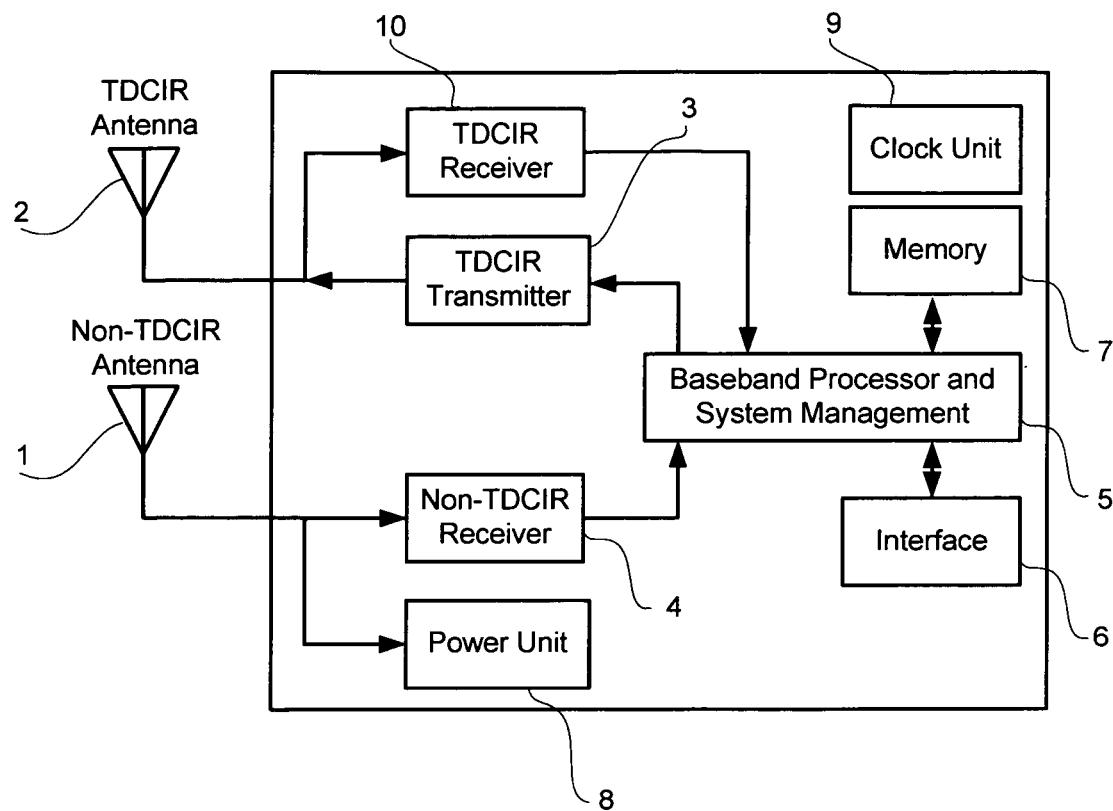
FIG. 2 is a block diagram depicting a transponder that is capable of receiving a TDCIR signal according to the fourth embodiment.

Referring to FIG. 2 the TDCIR path starting from a TDCIR antenna (1) contains not only a TDCIR transmitter (9), but also a TDCIR receiver (8) according to the fourth embodiment of the invention. The tag unit retains the capability to receive non-TDCIR e.g. continuous wave signals that at least partially power it up. This receive path can deploy a power unit (3) whose function includes power recovery from the incident non-TDCIR energy, but also a non-TDCIR receiver (10) that can decode the information modulated on the non-TDCIR signal, including the clock and command.

Figure 3:
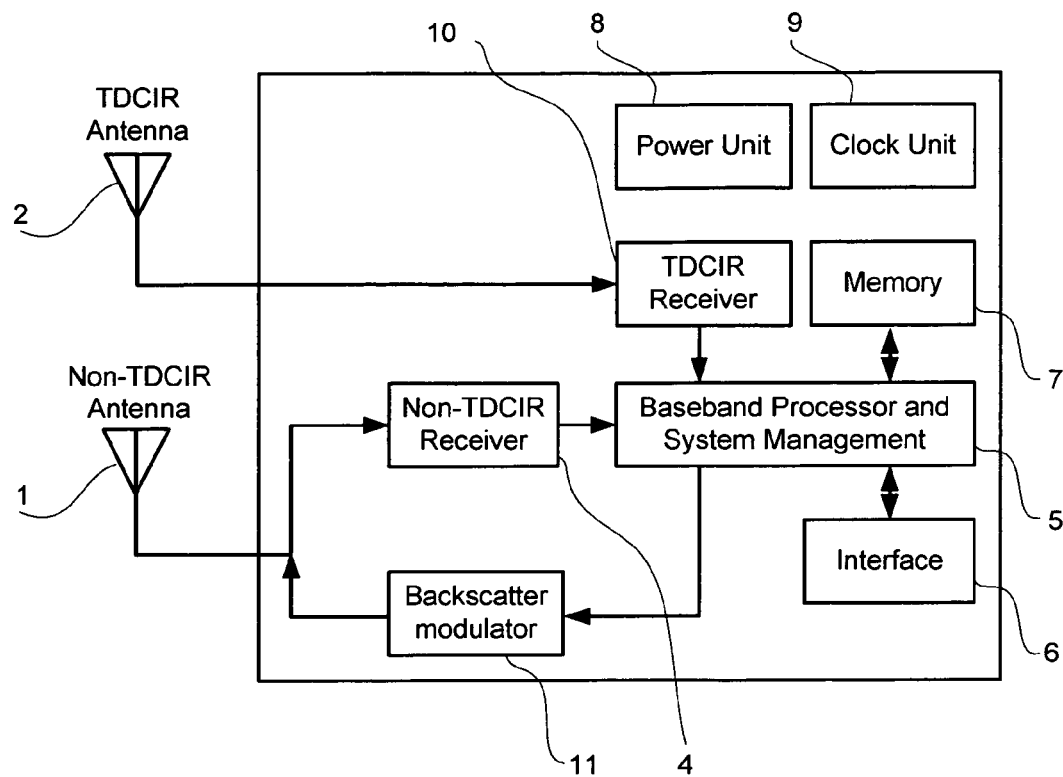
FIG. 3 is a block diagram depicting a transponder is capable of altering the impedance of the non-TDCIR antenna using circuitry to achieve backscattering, or magnetic coupling.

FIG. 3 illustrates a transponder is also capable of altering the impedance of the non-TDCIR antenna circuitry (2) to achieve backscattering, magnetic coupling or similar couplings according to the second embodiment. The non-TDCIR receiver (10) and the modulator (3) share the non-TDCIR path. The baseband/MAC processor (4) manages the control, reception and transmission of the data to and from (3) and (10).

Figure 4:
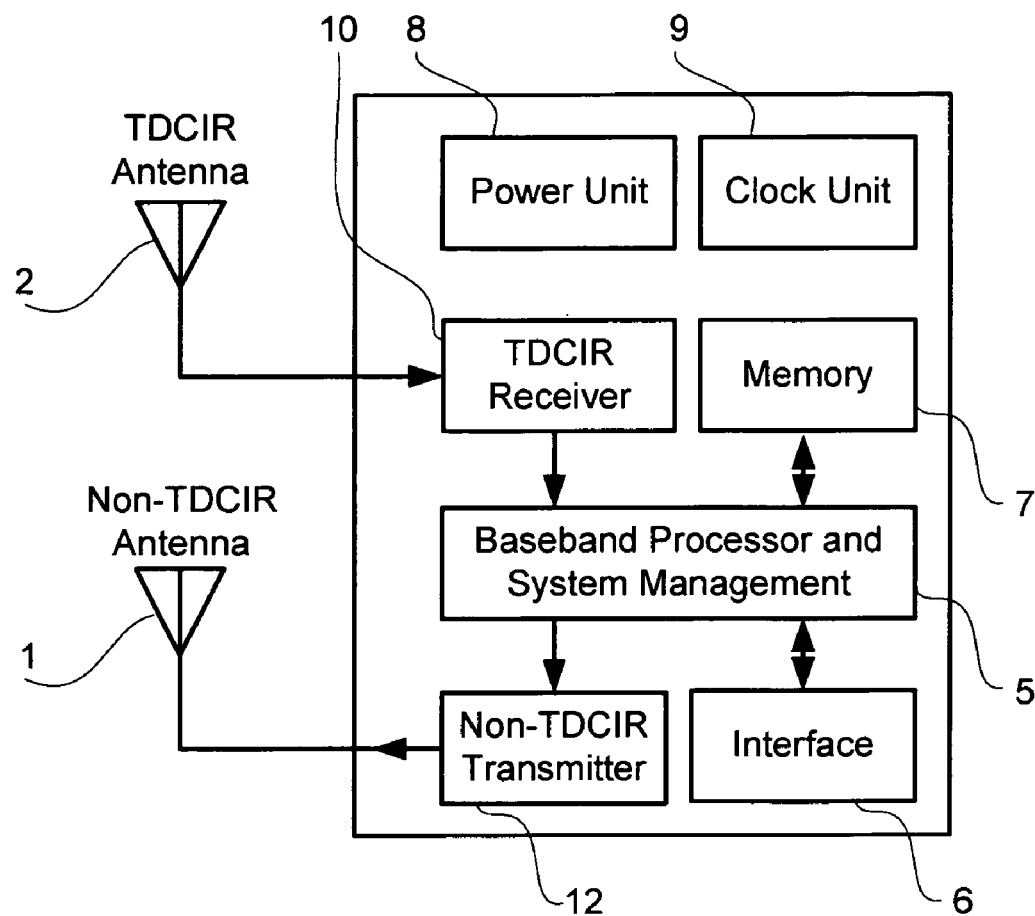
FIG. 4 is a block diagram depicting a simplified interrogator/reader.

FIG. 4 depicts a simplified embodiment of an interrogator/reader in accordance with this invention. The reader generates non-TDCIR signals through the non-TDCIR transmitter (3) and antenna (2), e.g. continuous wave RF signals with enough power inside the limits of allowed radiation that can power up the invented tag. This signal carries all the information needed by the tag including command and clock encoded in the signal by the baseband/MAC processor/FSM (4). Upon reception of enough power, the tag wakes up, recovers clock, decodes the received information, e.g. a command, and reacts in accordance with that information. For example, if a command pertains to sending the Unique Identification number of the tag (UID), the tag processor fetches this information from the memory, processes it to match the communication protocol used and feeds it to the TDCIR transmitter of the tag. The TDCIR path in the reader (1) through (9) receives the TDCIR signal containing e.g. the UID from the tag and forwards it to the baseband/MAC and systems management of the reader (4) which, after resolving the baseband signal and recovering that particular UID among all other simultaneously in-flowing information streaming in from the multitude of other tags, stores in its local memory (6) and/or transfers it to the external network via its multitude of interfaces to other internal or external units.

Figure 5:
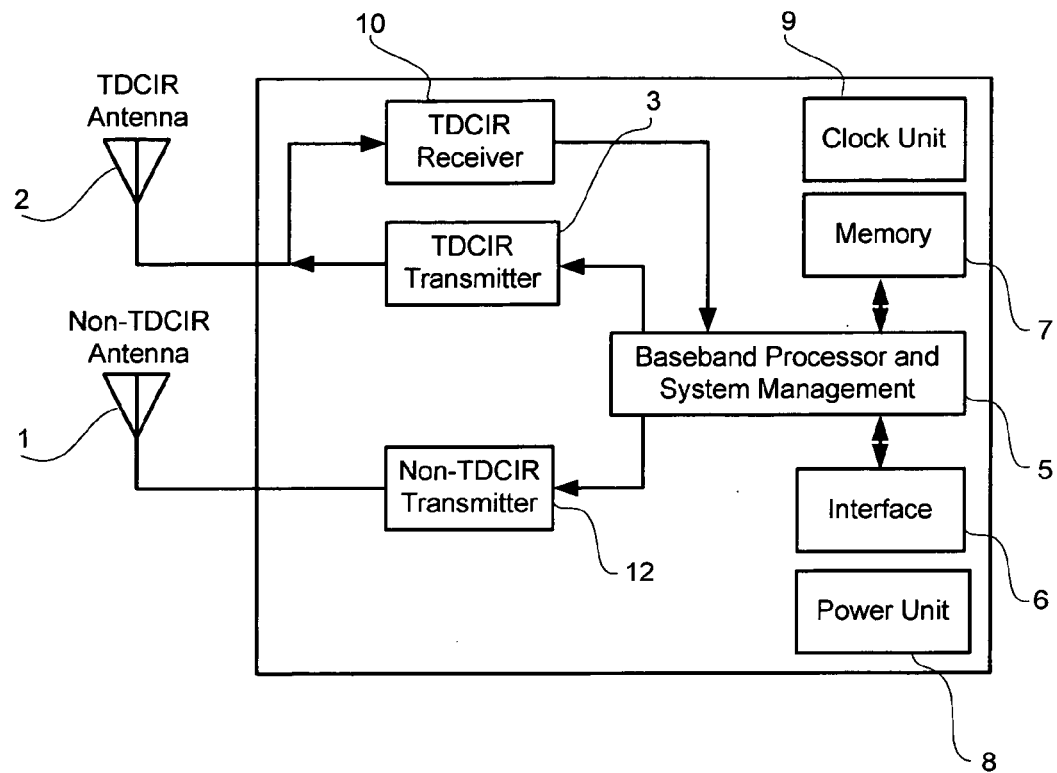
FIG. 5 is a block diagram depicting an interrogator/reader with the capability to transmit TDCIR signals.

FIG. 5 illustrates a reader with the additional capability to also transmit TDCIR signals so as to match the tag according to the fourth embodiment. The TDCIR path includes TDCIR antenna (1), TDCIR receiver (9) and TDCIR transmitter (9). This embodiment can not only power up and communicate with tags with a non-TDCIR receiver (10), but also can establish a data communication link with embodiments such as the one depicted in FIG. 2. The main benefit of such an embodiment is that it realizes a full-fledged Impulse Radio transceiver capable of capable of deploying all benefits of UWB-IR such as high data rate communication, resilience to environmental impacts, penetration and positioning in both directions of communication between the tag and the reader.

FIG. 6 illustrates the direction of communication and the radio technology of the transmitter and receiver units in a tag and a reader respectively. It also elucidates the directions called "uplink" and "downlink". The TDCIR and CW blocks are entangled into each other since they share many subsystems and provide mutual resources such as clock, synchronization, power management, data paths, etc. for one another; the block description is a high-level abstraction only and is not meant to imply separated blocks. TX stands for transmission function and RX stands for receiving function.

FIG. 7 depicts an embodiment of the front-end of a multi-band energizing and communication design in a tag. This is a high-level architecture of an RFID network. Each reader serves a number of tags. A multitude of readers can create a cellular, mesh or ad-hoc network. By building a cellular network, each interrogator can create a cell that covers the tags located in its coverage area or cell. Dislocation of tags or readers, results in handover of tags from one cell to another, as in a cellular telephony network or a Wireless LAN network. A cell controller can decide whether a tag is served better by one reader or another. Even readers can decide to actively seek another reader to serve a tag that cannot be served by them, e.g. because it is located in the periphery of their coverage area. This network serves tags that can be passive, active, semi-active and even Full-Duplex TDCIR (FD-TDCIR) tags. The latter is a tag that in addition to its non-TDCIR receiver, also has the capability to both transmit and receive TDCIR signals and by virtue of this capability is not only aware of what the reader transmits to the tags, but also can receive information from other tags of this invention. Furthermore each reader subnet can communicate with other subnets by means of wireless or wired links. All readers can also be served by other local servers over a Local Area Network or remote servers over a Wide Area Network interfaced by e.g. gateways and other proxy servers.

FIG. 8 is a block diagram of one embodiment of the invention. In this embodiment, the tag and the reader are designed such that they can function in a legacy network as well as the network of responders (tags) and interrogators (readers) as described by this invention. An invented reader that is compatible with legacy transponders (1) can communicate and interrogate legacy transponders (5), invented tags that are backwardly compatible with legacy transponders (4) and invented transponders deploying uplink TDCIR and downlink non-TDCIR technologies (3). A legacy interrogator (2) can communicate with its own legacy transponders (5), but also with invented transponders that are backwardly compatible with legacy systems (4), because the latter behave like legacy transponders when they find themselves interrogated by legacy readers.

Figure 9:
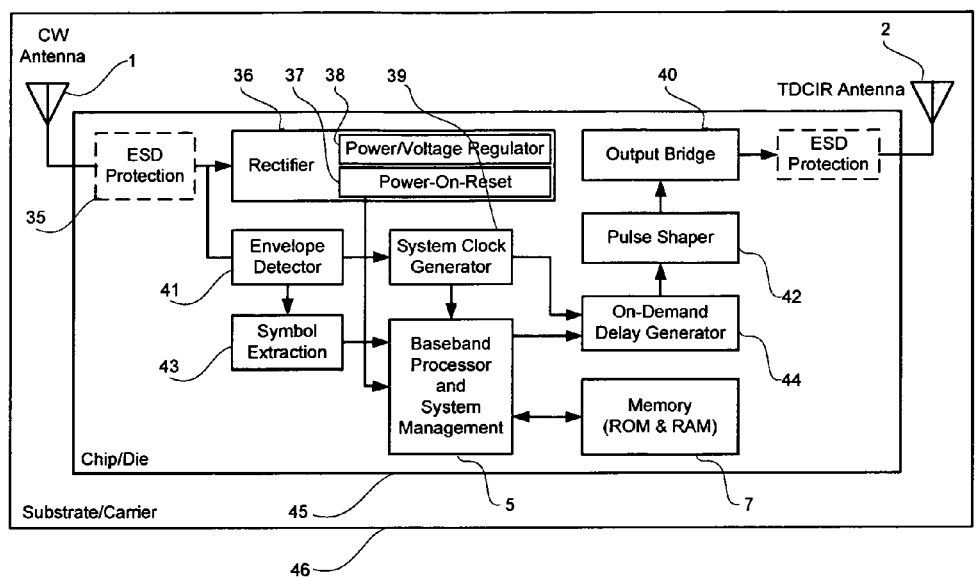
FIG. 9 is a block diagram depicting a transponder that is capable of receiving non-TDCIR and transmitting TDCIR signals according to the first embodiment.

FIG. 9 details the first embodiment of the transponder. A CW antenna (1) is tuned to the frequency of the incident UHF 915 MHz signal radiated by the invented reader and follows the UPC Global Gen-2 standard (Gen2 Specs 05). An Electrostatic Discharge (ESD) protection circuitry (2) protects the CMOS circuit against discharges that may occur during manufacturing, antenna attach and touch of the antenna substrate. The incident CW UHF signal is then directed to a power recovery block (3) that rectifies the electromagnetic wave, pumps it up to the required voltage level, regulates (5) and monitors (4) it for occurrence of under-voltage and over-voltage levels so as to know when to liven up the chip or shut it down to avoid interference with the network when not enough power is available. Once power is available, different units of the chip can be started.

The envelope detector (6) extracts the signal envelope and passes it to the symbol detection (8) and clock recovery/generation (7) units. The latter generates all the different clock frequencies that may be required by different blocks of the chip. It also kick starts the on-demand delay generator (11) that generates delay periods as commanded by the baseband/MAC/System manager unit and in synchronization with the system clock. The symbol extraction unit (8) transfers its demodulated symbols to the baseband unit (9) where they are decoded, parsed and interpreted as data and commands and state information. The Finite State Machine (FSM) that is labeled as Baseband processor (9) in the figure, acts as the central nervous system of the chip, where all central control, management and monitoring occurs. This unit has access to a memory block (10) that is composed of both volatile and non-volatile memory (here Read Only Memory, ROM and Random Access Memory, RAM). This memory contains UID, codes and all the data that is required for storage in the tag. The FSM (9) executes its tasks in accordance with the received commands, the current state and the available data on the chip. When commanded to transmit a piece of data, e.g. its UID, the FSM retrieves the related data from the memory, encodes it and provides the on-demand delay generator with the encoded data. The latter generates the delay which entails a trigger signal for the impulse generating and pulse shaping unit (12). This unit together with the output bridge circuit (13) creates a Gaussian monocycle with the pulse width of 4 ns with a maximum peak power of −42 dB as depicted in FIGS. 16 and 18. The Gaussian monocycle spans the spectrum between DC to 960 MHz with a center frequency of nearly 250 MHz and a bandwidth far beyond the minimum needed for qualification as a TDCIR. This signal is propagated by a TDCIR antenna (14) that is like its CW counterpart (1) a part of the substrate or the carrier (16) on which the chip or die (15) is attached.

FIG. 10 details second embodiment that is fundamentally very similar to the first embodiment detailed in FIG. 9. This second embodiment however deviates from the first embodiment in several respects. This is a so-called semi-active tag in which part of the power is provided by a battery or alike. The chip here utilizes a charging circuitry (8) as a part of its Rectifier/power recovery unit (6). The CW signal incident to the CW antenna (1) is rectified, regulated and used as a charge current for the accumulator and the excess power is used by the chip. When this excess energy does not suffice for running the tag, the accumulator charge flows into the tag as needed. Yet another difference between this second embodiment and the first embodiment of FIG. 9 is the sensors interfaced to it. An on-die temperature sensor (14) and an off-die vibration sensor (16) are added to this second embodiment. The information from the sensors can be accessed and used internally to e.g. compensate for the internal function of the tag circuitry or stored and transmitted to the reader as state information in which the object carrying the tag undergoes or has undergone.

Figure 11:
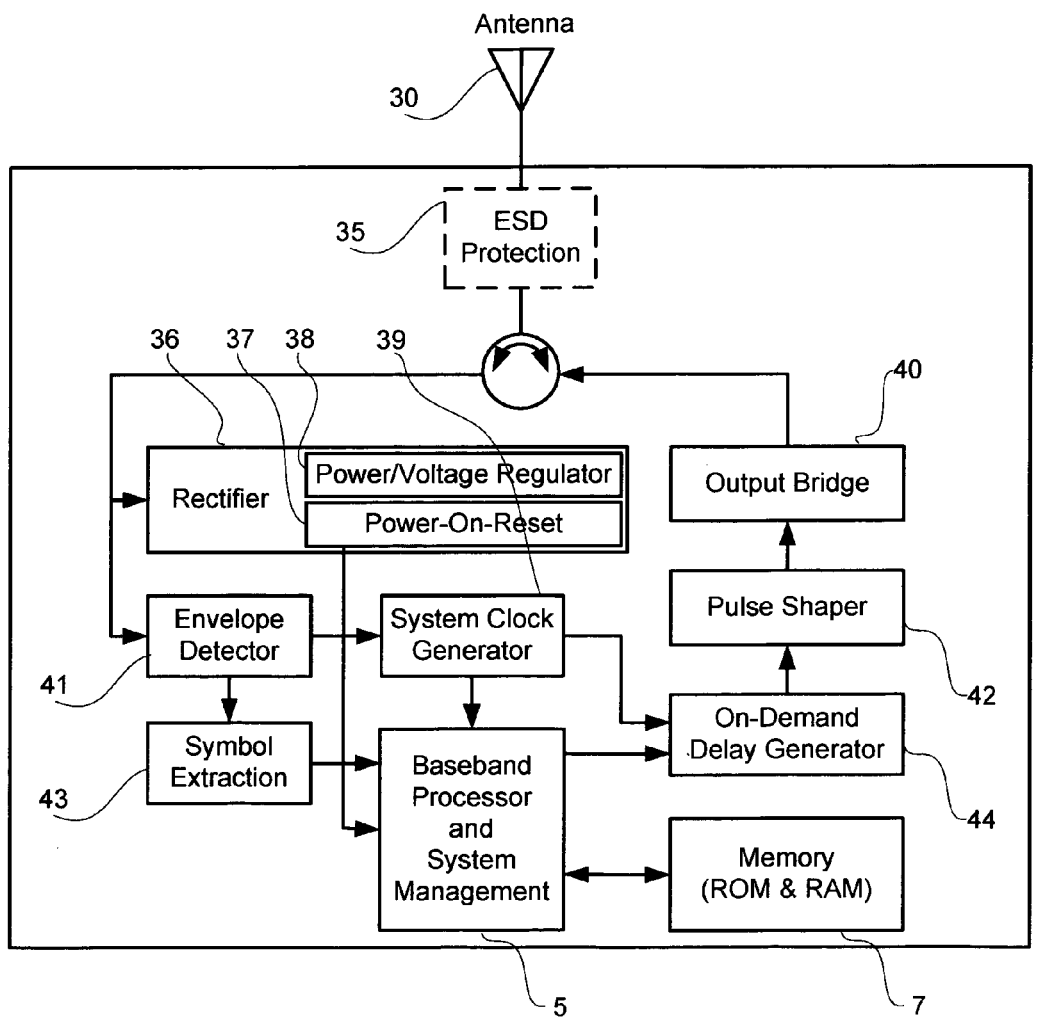
FIG. 11 is a block diagram depicting a transponder that is with a common antenna for TDCIR transmission and non-TDCIR reception.

FIG. 11 illustrates a third embodiment of this invention where the CW and TDCIR radios share the same antenna (1). UWB propagation has such requirements on the antenna design that are often contradictory to the requirements set by a narrower CW signal. While the CW antenna is tuned to remain in-band, UWB signals require antennas that are nearly frequency independent in an extremely wide band. However, there are antenna technologies that can allow for a single antenna solution. One class of antennas that can serve both technologies is the so-called fractal antennas. Some fractal antennas exhibit the interesting behavior that the antenna can be used for multiple frequencies. The performance dips in between these bands, but these dips can be beneficial to filter out portions of the spectrum where strong interference is expected, e.g. 2.4 and 5 GHz ISM bands, TV and radio bands, etc. This embodiment uses a fifth derivative of Gaussian as its pulse and occupies the spectrum between 3.1 to 10 GHz with a center frequency of roughly 6 GHz. All other function blocks are similar to the first and second embodiments described in FIGS. 9 and 10.

FIG. 12 illustrates the fourth transponder embodiment that implements a TDCIR receiver. The downlink is both a non-TDCIR signal and a TDCIR signal, while the uplink is TDCIR only. The receiver block (8) constitutes a very simple form of ultra wide receiver composed of an ultra wide band Low Noise Amplifier (LNA) (9) that boosts the incoming signals from the TDCIR antenna (1). The amplified signal from LNA is mixed in (11) with a signal template stored in (10). The output of the mixer is forwarded to an integrator (12) that integrates the mixer output in time and then outputs the values to a sample and hold block (14). The output from the S/H block is determined as logical highs and lows that are fed to the baseband processor (4) for decoding, formatting and parsing. This embodiment is also equipped with a general purpose interface (5) that can be used to connect it to other devices or be used as a programming or testing port.

Figure 13:
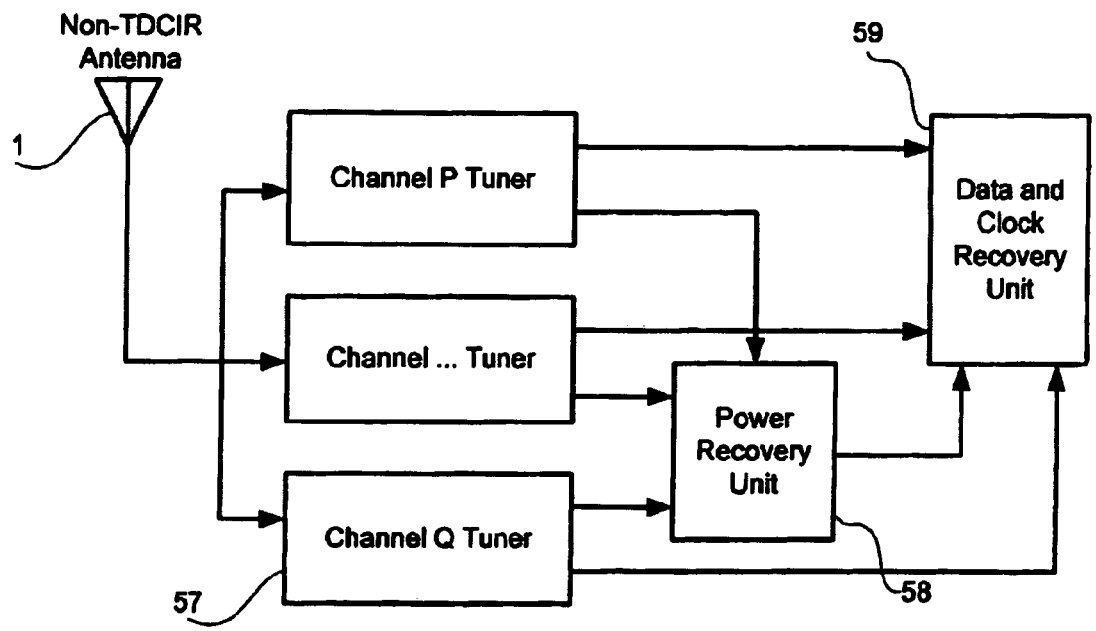
FIG. 13 is a block diagram depicting a transponder that is capable of receiving a multiband signal.

FIG. 13 illustrates how multiple non-TDCIR bands and channels can be used to better power up and communicate with transponders that are capable of multiband reception. The incident signal on the antenna (1) is channelized through the appropriate tuner (2) and the signal is rectified, integrated and regulated in a power recovery unit (3). The latter powers up the data and clock recovery unit (4) that in turn detects the data and clock modulated on the signals.

FIG. 14 explains the direction of the signals and the overlapping nature of the energizing signal with respect to the data exchange between the tags (4) and a reader (3) that is capable of multiple simultaneous continuous wave radio transmissions (1 and 2). As explained in FIG. 13, signals on different channels or bands can energize the same tag simultaneously and thereby enhance its ability to gain electrical energy. Different energizing signals can start and stop radiations while overlapping each other intermittently. The capability of the tags to be energized by CW signals in different bands (1 and 2) or to communicate over different bands with the readers can also enhance:

1) more robust CW communication and location determination. Since different bands behave differently with respect to environmental impacts and exhibit different RF characteristics that result in different noise figure, range, etc., simultaneous utilization of several different bands enhances data communication. Also, some particular frequency-dependent characteristics of RF like path-fading can have severe impacts on the ability to locate a tag with continuous wave signals. Since signals from different readers exhibit path-fading in different patterns depending on the frequency band used by the reader, if the tag can receive continuous wave signal from different bands, the probability that it encounters signal deterioration and path-fading on both bands will be much smaller than when a single band is used. The location determination technique is a downlink, CW location determination approach, not to be confused by the more robust and powerful Impulse Radio location determination ability in the uplink.

2) Multi-standard compatibility: Different standards typically use predefined bands of operation; a multi-band system automatically means that backward compatibility with several different standards can be effected.

3) multi-access techniques: By means of using different bands as a differentiator for accessing different tags or class of tags. A reader capable of accessing tags at different bands can use this ability to send different commands to different tags or categories of tags.

Figure 15:
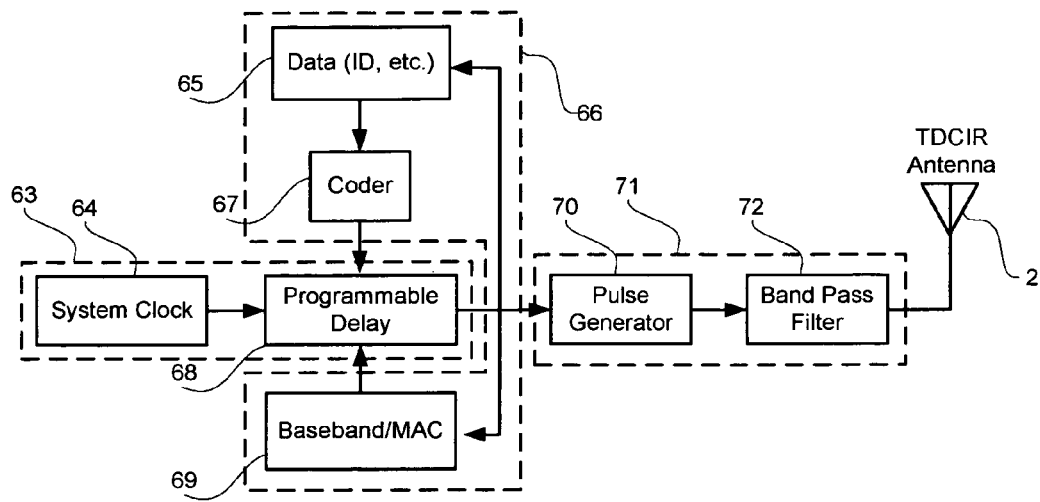
FIG. 15 is a block diagram depicting a TDCIR transmitter.

FIG. 15 depicts a block diagram depicting the architecture of the TDCIR transmitter subsystem. Data stored in the tag (1) is coded in accordance with protocols that are well known in the art. Coding fulfills a number of objectives, among which robustness, encryption and spreading are a few to mention. A programmable delay module (5) helps to control the position of the impulse in its own time slot or in a larger time frame; pulse positioning as a modulation technique or otherwise can thereby be achieved. In other embodiments where another modulation approach is used, this module can be complemented or substituted by a different modulator, e.g. a PSK (Phase Shift Keying) modulator. Since the system clock frequency is normally kept low to save power and spectrum, this module is generally needed for higher data rates and more sophisticated multi-access schemes, regardless of modulation technique used. The system clock (4) locally generated or recovered from the incident non-TDCIR signal creates a time base that in turn is used for creating synchronization signals, time slots, time frames, etc. If the recovered clock is a fast clock, it can be directly used by the pulse generator module (6) for shaping the TDCIR impulse; otherwise other pulse generation techniques, such as deployment of a delay circuitry as in module (5) need to be applied. The band pass filter stage (7) will finally keep the propagated signal inside the limits of regulated emissions and the signal is propagated by the TDCIR antenna (8).

FIG. 16 depicts a Gaussian monocycle as used in the TDCIR transmitter of the first embodiment.

FIG. 17 depicts a 5th derivative of a Gaussian as used in the second embodiment.

FIG. 18 depicts the Power Spectral Density of the monocycle (solid line), the 5th derivative of Gaussian (thick dotted line) and the FCC envelope (thin dashed line).

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An asymmetric bandwidth communication system comprising:
   a. a powered interrogator/reader downlink transmitting in a non-TDCIR signal;
   b. a transponder or tag receiving said non-TDCIR signal to at least partially or wholly power said tag;
   c. said non-TDCIR downlink transmission from said interrogator/reader instructing said transponder to broadcast data;
   d. said transponder uplink communicating with said interrogator/reader using time domain carrierless impulse radio (TDCIR) having ultra wide bandwidth frequency spectrum of a short time duration pulse; and
   e. said powered interrogator/reader receiving the TDCIR ultra wide band short time duration pulse uplink communication;
   whereby data is communicated from said transponder or tag to the said interrogator/reader using very little transponder power and an uncomplicated, low cost transponder design that is easily manufactured.

2. An asymmetric bandwidth communication system as recited by claim 1, wherein said interrogator/reader communicates with said transponder or tag at a frequency of approximately centered on 915 MHz.

3. An asymmetric bandwidth communication system as recited by claim 1, wherein said Time Domain Carrierless Impulse Radio (TDCIR) has a fractional bandwidth equal to or greater than 10%, or a bandwidth greater than 50 MHz, regardless of said fractional bandwidth.

4. An asymmetric bandwidth communication system as recited by claim 1, wherein said interrogator/reader communicates with said transponder or tag to determine the location of said tag.

5. An asymmetric bandwidth communication system as recited by claim 1, wherein said transponder or tag additionally communicates with said interrogator/reader using conventional RF communication uplink with onboard additional power source.

6. An asymmetric bandwidth communication system as recited by claim 5, wherein said transponder or tag additionally modulates the RF signal by backscatter modulation.

7. An asymmetric bandwidth communication system as recited by claim 5, wherein said transponder or tag operates in a legacy RF system communicating with legacy interrogators/readers.

8. An asymmetric bandwidth communication system as recited by claim 1, wherein said system accepts active transponders, passive transponders of legacy architecture and transponders communicating by TDCIR ultra wide band short time duration pulse.

9. An asymmetric bandwidth communication system as recited by claim 1, wherein said transponder or tag downlinks and uplinks with said interrogator/reader for RF communication and TDCIR communication by a single common antenna.

10. An asymmetric bandwidth communication system as recited by claim 1, wherein said interrogator downlinks to said transponder or tag by RF and TDCIR to communicate massive data and said transponder receiving said RF by first antenna and receiving said TDCIR communication by a second antenna and uplinking with said interrogator/reader by TDCIR communication by said second antenna.

11. An asymmetric bandwidth communication system comprising:
  a. a powered interrogator/reader downlink transmitting in a non-TDCIR signal;
  b. a transponder or tag receiving said non-TDCIR signal to wholly power said tag;
  c. said non-TDCIR downlink transmission from said interrogator/reader instructing said transponder to broadcast data;
  d. said transponder uplink communicating by a second antenna with said interrogator/reader using time domain carrierless impulse radio (TDCIR) having ultra wide band width frequency spectrum and a short time duration pulse; and
  e. said powered interrogator/reader receiving the TDCIR ultra wide band short time duration pulse uplink communication;

whereby data is communicated from said transponder or tag to the said interrogator/reader using very little transponder power and an uncomplicated low cost transponder design that is easily manufactured.

12. An asymmetric bandwidth communication apparatus, comprising at least one Time-Domain Carrierless Impulse Radio (TDCIR) transmitter and at least one non-TDCIR receiver.

13. Apparatus according to claim 12 wherein a TDCIR signal is an Ultra Wide Band Impulse Radio (UWB-IR).

14. Apparatus according to claim 12 wherein a non-TDCIR signal is a Continuous Wave (CW) RF signal.

15. Apparatus according to claim 12 wherein at least one non-TDCIR signal is a magnetic, electric, electromagnetic or optical coupling signal.

16. Apparatus according to claim 12 that is partially or wholly powered up by the non-TDCIR signal.

17. Apparatus according to 12, also including memory.

18. Apparatus according to 12, also including digital or analog computational circuitry.

19. Apparatus according to 12, also including digital or analog interface to other units.

20. A system composed of at least two apparatuses as recited in claim 12 wherein one apparatus acts as an interrogator and the other as a transponder.

21. An asymmetric bandwidth communication apparatus, comprising at least one non-TDCIR transmitter and at least one TDCIR receiver.

22. Apparatus according to claim 21 wherein a TDCIR signal is an Ultra Wide Band Impulse Radio (UWB-IR).

23. Apparatus according to claim 21 wherein a non-TDCIR signal is a Continuous Wave (CW) RF signal.

24. Apparatus according to claim 21 wherein at least one non-TDCIR signal is a magnetic, electric, electromagnetic or optical coupling signal.

25. Apparatus according to claim 21 that is partially or wholly powered up by the non-TDCIR signal.

26. Apparatus according to 21, also including memory.

27. Apparatus according to 21, also including digital or analog computational circuitry.

28. Apparatus according to 21, also including digital or analog interface to other units.

29. A system composed of at least two apparatuses as recited in claim 21 wherein one apparatus acts as an interrogator and the other as a transponder.

* * * * *

UNITED STATES PATENT AND TRADEMARK OFFICE
CERTIFICATE OF CORRECTION

PATENT NO. : 7,180,421 B2  Page 1 of 1
APPLICATION NO. : 11/270922
DATED : February 20, 2007
INVENTOR(S) : Kourosh Pahlavan and Farokh Hassanzadeh Eskafi It is certified that error appears in the above-identified patent and that said Letters Patent is hereby corrected as shown below:

Title Page
(12) United States Patent
 delete "Pahlaven" and substitute therefore -- Pahlavan --.

(76) delete "Pahlaven" and substitute therefore -- Pahlavan --.

Signed and Sealed this

Twenty-sixth Day of February, 2008

JON W. DUDAS
*Director of the United States Patent and Trademark Office*